INVENTOR.
WILBUR D. PRICER
BY
ATTORNEY 3,449,727
Patented June 10, 1969

3,449,727

TRANSISTOR LATCH MEMORY DRIVEN BY COINCIDENTALLY APPLIED OPPOSITELY DIRECTED PULSES

Wilbur D. Pricer, Pleasant Valley, N.Y., assignor to International Business Machines Corporation, Armonk, N.Y., a corporation of New York Filed Dec. 27, 1965, Ser. No. 516,306
Int. Cl. G11b *9/00*
U.S. Cl. 340—173 11 Claims

ABSTRACT OF THE DISCLOSURE

A simplified memory cell and an array of such cells is disclosed. Each of the cells is uniquely constructed to keep the number of active devices, as well as the associated bias and signal source, to a minimum. The sources are connected to each memory cell in such a way as to drive the cells with appropriately applied pulses so that the functions of reading and writing can be readily performed.

This invention relates to a memory or storage device and, more particularly, to a transistor memory for use in a memory system.

Computers and data processing machines in general require memories suitable for the storage of digital data in the form in which such machines are designed to operate on data to perform their functions. Almost all digital machines operate with the information in the binary form of zeros and ones. In order to store the vast quantities of information that are to be processed by modern day data processing machines, large arrays of individual storage devices, usually in matrices, are required. Each device must be capable of storing a "bit" of digital information, that is, a "0" or a "1." In such machines, which machines, which process and operate on data at a great rate, it must be possible to place information in the memory system, sometimes referred to as writing in information, and to read out such information very rapidly.

One of the most popular devices for the storage of digital information is the magnetic core which stores information by means of the remanent magnetic states of the core. This device owes its popularity, among other reasons, to the fact that it consumes no power in the quiescent states, and great numbers of these devices may be arranged in a limited space. Another device which has received a great deal of attention recently, and which has been suggested for memory applications, is the tunnel diode. The tunnel diode is a two-terminal semiconductor device exhibiting in its voltage current characteristic two distinct positive resistance regions separated by a negative resistance region. Because of this characteristic the tunnel diode is capable, in the simplest of circuitry, of providing two distinct stable states.

The conventional junction transistor, which is a device well-known in the art, has been used extensively in various types of electronic circuits because of its well known advantages of small size, low power losses, sturdiness reliability, etc. The conventional junction transistor, however, does not provide distinct stable states when connected alone in a simple circuit, and it is necessary to use pairs of such transistors and regenerative feedback means to achieve the requisite stable states. For this reason, as well as others, transistors have not heretofore been found to be cheap enough, in terms of cost per bit of information to be stored, to be adapted to large scale memory systems.

In order to provide a transistor memory that will compete economically and will approach the speed capabilities of other memories, such as tunnel diode memories, it must be possible to fabricate these devices in tremendous numbers and to achieve great packing density on the order of many thousands of such memory devices per square inch. However, it is not simply a question of packing great numbers of these memory cells in a given volume, since there arises the matter of the interconnections to the many thousands of such devices. Internal circuitry must be simple enough to make such cells competitive with other proposals.

The present invention provides a memory or storage cell that is uniquely adapted to be fabricated in monolithic form. By monolithic is meant that type of integrated semiconductor circuitry wherein the required numbers of devices are all contained in a block or monolith of semiconductor material. Huge assemblies of devices are conventionally realized today by the diffusion technology which can be advantageously directed to the formation of a plurality of discrete active devices by a sequence of masked diffusion steps. By means of various techniques the individual devices are isolated within the monolith. Interconnection patterns which allow for connecting a plurality of devices in suitable electrical circuit configurations are normally provided on the top surface of the semiconductor monolith and insulated therefrom.

It is a primary object of the present invention to provide an extremely simple memory cell readily implemented by monolithic techniques of device fabrication.

Another object is to provide a memory cell capable of high speed operations on the order of tens of nanoseconds.

A further object is to provide a memory cell from which information may read out nondestructively.

In accordance with the broad feature of the present invention, a memory cell is constructed from as few as two transistors and two impedances thereby keeping the number of components at an absolute minimum. The memory cell, from the circuit standpoint, is a Schmitt trigger, direct coupled and preferably involving the use of silicon transistors to provide the necessary hysteresis.

The term "direct coupled" when used with respect to transistor circuitry, refers to the fact that there is no impedance element present in the connecting link from one point to another. Thus, considering the aforementioned Schmitt trigger, the series coupling from the collector of one of the transistors to the base of the other transistor involves no impedance element such as resistance or capacitance.

In accordance with another feature, a plurality of such memory cells are interconnected in a matrix to realize a number of highly desirable characteristics in a complete memory system.

Further advantages of the memory cell and the system of the present invention reside in the fact that the logic inputs also served as power inputs, and hence the number of terminals is minimized. This last factor is, of course, of major importance for implementation in monolithic integrated circuitry. It should also be noted that both a destructive and a nondestructive read out may be obtained by the use of suitable means connected to the memory cell.

Briefly considered, the memory cell of the present invention is embodied in a circuit which basically comprises a Schmitt trigger. In the transistor art such a circuit includes a pair of transistors of like conductivity type and having one regenerative feedback path intercoupling the emitters of the pair of transistors, and a second regenerative feedback path intercoupling the base of one of the transistors and the collector of the other.

In the memory cell of the present invention, the input to the base of a second transistor of the pair is referred to as the "word line." The line to the collector of the second transistor, and hence, to the base of the first transistor, is referred to as the "bit line." The line to the collector of the first transistor is referred to as the "sense line," and the line to the common emitter resistor as the "nondestructive read out word line" or "NDRO word line." Energization means are connected to the several lines for performing the write and read out functions.

In order to write in information, for example, to write a "1," the word line is driven positively and the bit line is coincidently driven negatively, the combined drives causing a decrease in the collector potential of the second transistor. This action renders the first transistor nonconductive. When both drives are removed the second transistor remains conductive. To write a "0" into the cell, the bit line is left at its relatively high positive potential and only the word line is driven positively. The circuit is so designed that the collector potential of the second transistor does not fall sufficiently to cut off the first transistor.

To perform the read operation, assuming a "1" is stored with the second transistor conductive, the word line is driven negatively, thereby decreasing the conduction in the second transistor causing its emitter potential to traverse negatively. The emitter-base junction of the first transistor becomes forward biased and the first transistor begins to conduct thereby reverse biasing the emitter-base junction of the second transistor and causing the second transistor to cease conduction. However, if the first transistor was originally conductive, that is, the memory cell was storing a "0," it will continue to conduct uneffected by the change in potential on the word line. A current change will appear on the sense line only if the cell was storing a "1," that is, only if the first transistor was nonconductive will a current change appear on the sense line.

In order to perform a nondestructive read out operation, a positive going signal is applied to the terminal connected to the common emitter resistor for both transistors. Only if the first transistor is conducting will a signal appear on the sense line indicating that a "0" is being stored. If a "1" is being stored, the first transistor being nonconductive, then no signal will appear on the sense line.

The foregoing and other objects, features and advantages of the invention will be apparent from the following more particular description of preferred embodiments of the invention as illustrated in the accompanying drawings.

Figure 1:
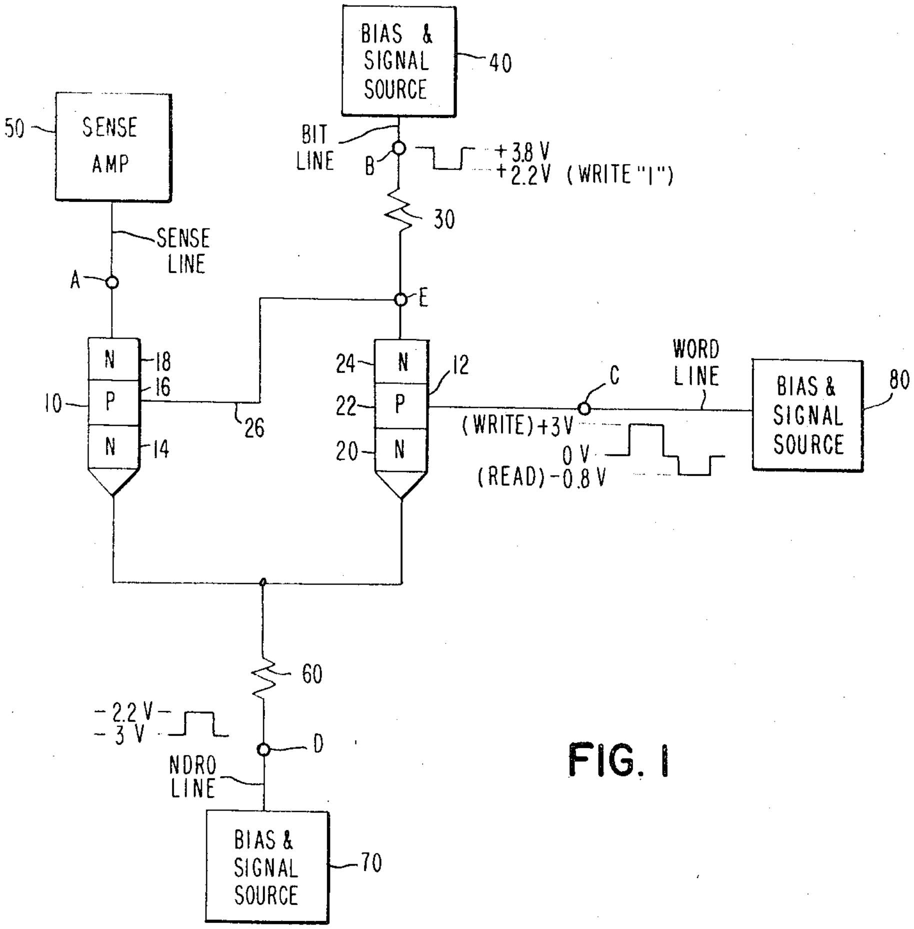
FIG. 1 is a schematic circuit diagram partly in block form of one arrangement of a memory cell in accordance with the present invention.

Referring now to FIG. 1, a first transistor 10 and a second transistor 12 are provided, typically of the N-P-N type. Each of these transistors is provided with conventional emitter, base, and collector regions, designated 14, 16 and 18 respectively for transistor 10, and 20, 22 and 24 for transistor 12. The base 16 of transistor 10 is coupled directly to the collector 24 of transistor 12 by means of lead 26. The collector 24 of transistor 12 is connected through a suitable load resistor 30, having a value, for example, of 2.8K, and thence through terminal B to bias and signal source 40. Collector 18 of transistor 10 is connected through terminal A to a sense amplifier 50. For convenience, the line from terminal A to the sence amplifier 50 is referred to as a "sense line," and the line from terminal B to the bias and signal source 40 is referred to as a "bit line." This will be appreciated fully in the context of a complete matrical array as will be described hereinafter.

The emitters 14 and 20 of transistors 10 and 12 respectively are coupled together to a common point and are connected by suitable leads to the terminal D through emitter resistor 60, having a value, for example, of 1.8K. From terminal D connections are made to bias and signal source 70. The line from terminal D to the bias and signal source 70 will be referred to as the "NDRO line."

The base 22 of transistor 12 is connected to terminal C and thence by suitable leads to the bias and signal source 80. For reasons that will be apparent later, the line to the base 22 of transistor 12 is denominated the "word line."

It will be understood by those skilled in the art that the portion of the circuit of FIG. 1 bounded by the upper terminals A and B, by terminal C on the right, and by the lower terminal D, is available for ready implementation in monolithic form. Thus, a plurality of like circuits, each corresponding to the portion just mentioned, may be created in a block of semiconductor material by well-known techniques, and then by suitable interconnections on the top surface of the monolith the common energization means 40, 70 and 80 and the common sense means 50 would be tied to the appropriate terminals A, B, C and D of each memory cell. For illustrative purposes, each of the sources of energization means 40, 70 and 80 are considered to be combined bias and signal sources, but it will be appreciated that separate sources of D.C. bias, such as batteries, could be employed. For example, to the collector resistor 30 of transistor 12 a battery having a value of 3.8 positive would be connected, and to the common emitter resistor 60, a battery having a value of 3 volts negative.

Considering now the operation of the memory cell circuit of FIG. 1 in the quiescent state, that is, when no pulses from the signal sources are being applied, either the transistor 10 or the transistor 12 is in the conductive state. When the transistor 10 is conductive, it is considered that a "0" is being stored, and when transistor 12 is conductive, a "1" is being stored. With the coupling or regenerative feedback arrangement provided by the lead 26 from the collector 24 of transistor 12 to the base 16 of transistor 10, transistor 12 when conductive will keep transistor 10 conductive. Thus, assuming transistor 12 is conducting such that point E is more negative than point C, then transistor 10 is cut off.

To read out information from the memory cell in FIG. 1, still assuming that transistor 12 is conductive and transistor 10 is nonconductive, the word line is driven negatively. Thus, as shown in FIG. 1, at point C, a pulse is applied from bias and signal source 80 such as to lower the potential at point C from 0 volt to −0.8 volt. With application of this negative potential the emitter current of transistor 12 becomes insufficient to retain the potential of terminal E below terminal C. Thus, point E will become more positive than point C and transistor 10 will begin to conduct. Transistor 10 now conducting, rapidly back-biases transistor 12 as point E now approaches the potential of point B which is held at +3.8 volts. The word line is now returned to its normal bias level. Thus, point C goes back to 0 volt. Transistor 10 continues to conduct.

If transistor 10 had originally been conducting, it would have continued to conduct unaffected by the action of the word line. Thus, the lowering of the potential at point C from the 0 volt to −0.8 volt would only have effected a change in the state of transistor 12 if transistor 12 had been conducting. Thus, only if transistor 12 had been conducting will a current change appear on the sense line (point A) and be sensed by the sense amplifier 50.

At the end of the read operation as described above, transistor 10 is conducting, or considering an array of like memory cells, all of the like transistors in all of the bits in a word would be conducting.

When it is desired to write information into the memory cell circuit of FIG. 1, the word line is driven positively. Thus, by application of a signal from source 80, the potential at point C is raised from 0 volt to +3 volts. If it is desired to write a one into the cell, the bit line is driven negatively. Thus, a pulse is applied coincidently from the source 40 to cause the potential at point B to go from +3.8 volts down to +2.2 volts. With point C being driven positively point B driven negatively, transistor 12 will conduct and cut off transistor 10. When both drives are removed transistor 12 will continue to conduct, and this represents, of course, the storage of a "1."

If it is desired to write a "0" into the memory cell, point B is not driven negatively as previously described but is kept at +3.8 volts while point C is being driven positively. In this case, transistor 12 does not conduct and transistor 10 remains conducting.

It is often highly desirable in memory systems that the storage devices may be read out nondestructively, that is, in a manner which makes it possible to ascertain the state of the device without requiring that the state be changed. In FIG. 1, the bias and signal source 70 may be provided with means to enable nondestructive read out. Ordinarily, the source 70 would be of such character that a fixed bias would be applied to point D. However, for nondestructive read out the potential at point D would be altered by a pulse from source 70 to raise or lower the potential at point D slightly, for example, from —3 volts to —2.2 volts. If, at the read out time, transistor 10 is conducting, the slight raising of potential at point D would cause a change in the current flow in transistor 10, and this will be detected by sense amplifier 50. When the potential at point D returns to —3 volts the transistor 10 will continue to conduct. Thus, there will have been no change of state in the cell, and if a zero was being stored by reason of transistor 10 being conductive, this state will continue.

On the other hand, if a "1" was being stored when the nondestructive read out is performed, in which event transistor 12 will be conductive and transistor 10 nonconductive, the raising of the potential at point D will not effect any change in the current flowing in transistor 10, and hence there will be no signal sensed by the same amplifier 50.

Figure 2:
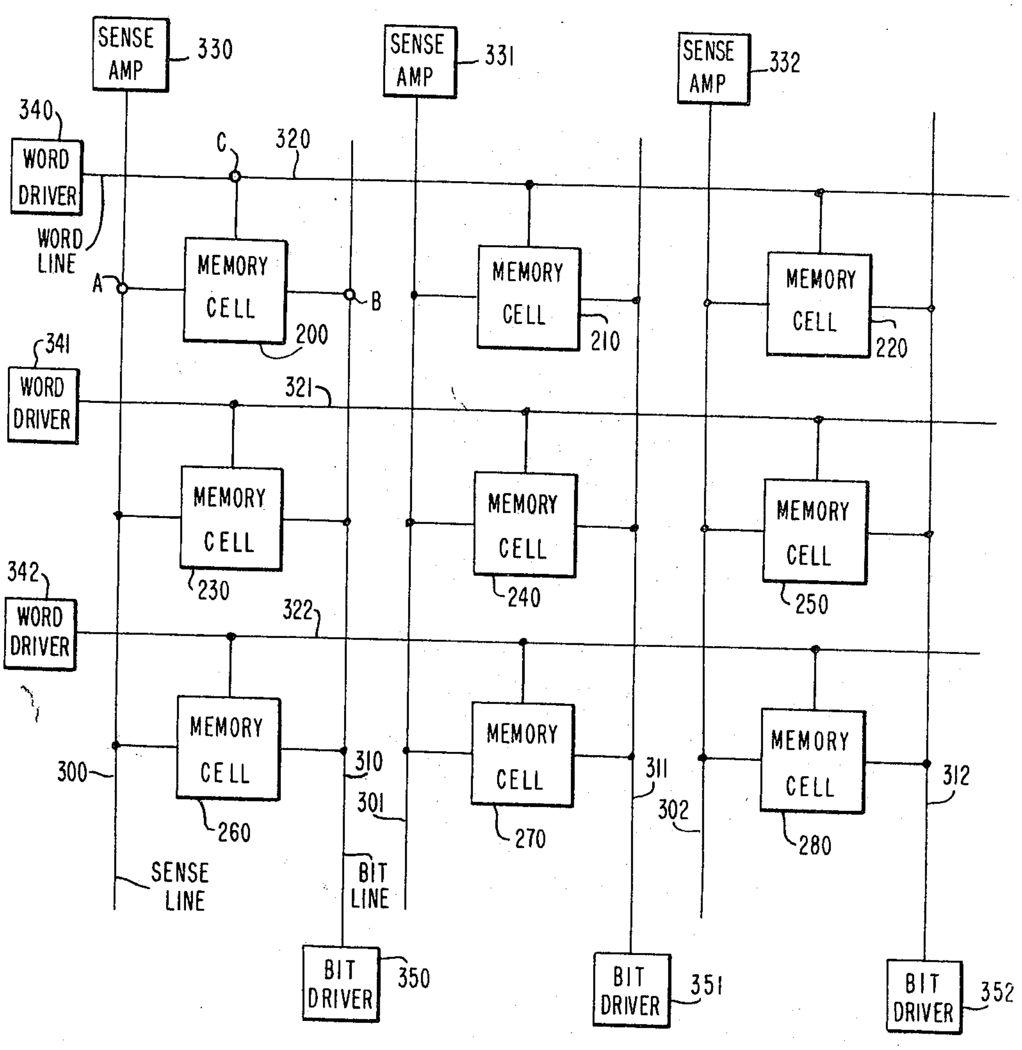
FIG. 2 is a block diagram of a memory matrix having a plurality of memory cells each as shown in FIG. 1.

Referring now to FIG. 2, a memory system in accordance with the present invention is illustratively embodied in a 3 x 3 matrix. The matrix comprises a plurality of interconnected memory cells 200–280. Cells 200, 210 and 220 are arranged to correspond to the several bit positions in a given data word, and the memory cells in the other rows, that is, cells 230, 240, 250, in the second row and cells 260, 270, 280 in the third row correspond to bit positions in other data words.

Each of the memory cells of FIG. 2 corresponds to the cell previously illustrated in FIG. 1 except that, for simplicity, it is assumed that the point D is connected to a fixed bias and that nondestructive read out in the manner heretofore described is not to be performed with the matrix. However, it will be obvious to those skilled in the art that an additional line and signal source for each row of the matrix can be added for this purpose. The memory cell 200 is shown as having point A connected to the sense line 300, point B to the bit line 310 and point C to the word line 320. Sense line 300 is also connected to point A of cells 230 and 260, bit line 310 likewise to point B of cells 230 and 260, whereas word line 320 is connected at the same point C to the cells 210 and 220 which correspond to different bits of the same word. Sense lines 301 and 302 and bit lines 311 and 312 are connected to the cells in the other columns and the additional word lines 321 and 322 are connected to the cells in their respective rows.

A plurality of sense amplifiers 330, 331 and 332 are connected respectively to sense lines 300, 301 and 302. These sense amplifiers conform essentially with the previously described sense amplifier 50 illustrated in FIG. 1. A plurality of word drivers 340, 341, 342, conforming to previously described source 80, are connected respectively to word lines 320, 321, 322 and the plurality of bit drivers 350, 351, 352, conforming to previously described source 40, are connected respectively to bit lines 310, 311 and 312.

In the operation of the memory matrix of FIG. 2, as one example, let it be assumed that it is desired to write information into the various memory cells, and further, let it be assumed that it is desired to write a "1" into the cells 200, 240, and 280, the memory cell 200 being in the first column on the left, and the first row at the top of the matrix, and the other cells 240 and 280 being in the second column, second row, and third column, third row respectively.

As was described before in connection with FIG. 1, a pulse is applied from the word driver 340 so that the potential at point C in each of the memory cells 200, 210 and 220 is raised to a potential of +3 volts. However, since it is desired to write a "1" only into cell 200 in the top row, only the bit driver 350 delivers a pulse on bit line 310 to the point B of the cell 200. Because cell 200 in column 1 is coincidently receiving a pulse from word driver 340, there will be the combined effect of the drivers 340 and 350 only on the cell 200 effectively putting this cell in the "1" state.

Likewise, a "1" is written into the cells 240 and 280 by the coincident application of pulses from word driver 341 and bit driver 351 to cell 240 and the coincident application of pulses from word driver 342 and bit driver 352 to cell 280. All the other cells in the array will continue in the "0" state.

To read out information from the memory matrix of FIG. 2, the same scheme as was employed with the basic cell of FIG. 1 is again used. Thus, to read out memory cell 200, the word driver 340 applies a pulse to point C of cell 200 so as to reduce the potential at point C to —.8 volt, and since transistor 12 of the memory cell 200 is conductive, with the cell 200 storing a "1," this would be detected by the sense amplifier connected to cell 200, namely, sense amplifier 330 connected to point A of cell 200. However, at the points A of cells 210 and 220 there will be no signal detected by their respective sense amplifiers 331 and 332.

In similar fashion when word drivers 341 and 342 are in turn energized, there will be at that time a signal detected only by sense amplifiers 331 and 332 respectively, since only the bit positions corresponding to cells 240 and 280 respectively, have a "1" stored.

There has been described herein a unique memory cell requiring only two transistors and two resistors in its construction and a memory system in which that cell is effectively utilized. The cell and the memory system comprising a plurality of same can be readily implemented in a single monolith or block of semiconductor material. Further, the basic memory cell circuit is very simple, yet highly stable. Tolerable ranges of drive current are largely determined by the supply voltages rather than the transistor or resistor parameters. In addition, the driving impedance may be kept relatively high thereby facilitating the use of voltage drive.

The transistor latch memory of the present invention has the added advantage of a "free" collector, a plurality of which may be connected together in an ORed configuration, as in the described memory matrix, so that sensing can be done without significantly affecting the tolerances of the individual circuits. Hence, large signals can be extracted in this maner. As heretofore described, nondestructive read out may be obtained if desired.

Although one basic circuit configuration for the memory cell has been illustrated in FIG. 1, it will be appreciated by those skilled in the art that if desired, the collector resistor 30 as shown in FIG. 1, may be replaced by an emitter follower. Such replacement eases the bit drive requirements but requires a high beta for transistor 10.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A memory cell comprising a pair of three terminal solid state devices, a first terminal of one of said devices being directly connected to a second terminal of the other device, a load impedance connected to said first terminal of said one of said devices and a common impedance connected to the third terminal of both of said devices, said memory cell having two quiescent states, a first state in which said one of said devices is conductive and the other is nonconductive, and a second state in which the other is conductive and said one is nonconductive; means for controlling the quiescent state of said memory cell, said means including a first variable potential source connected through said load impedance to said first terminal and a second variable potential source directly connected to the second terminal of said one device for providing a change of potential in a first direction; said first and second sources being operative coincidently with oppositely directed pulses to produce said first state.

2. A memory cell as defined in claim 1, further including means for reading out said cell comprising said second source operative alone for providing a change in potential opposite in direction to the change of potential in said first direction, and sensing means connected to the first terminal of said other device for sensing a change in the quiescent state of said cell.

3. A memory cell comprising a pair of transistors, each having an emitter, base and collector, the collector of one of said transistors being directly connected to the base of the other transistor, a load impedance connected to the collector of said one of said transistors, and a common impedance connected to the emitter of each of said transistors; said memory cell having two quiescent states, a first state in which one of said transistors is conductive and the other is nonconductive, and a second state in which the other is conductive and said one is nonconductive, means for controlling the quiescent state of said memory cell, said means including a first source connected to said load impedance and a second source directly connected to the base of said one of said transistors, said second source providing a change in potential in a first direction, said first and second sources being operative coincidently with oppositely directed pulses to produce said first state.

4. A memory cell as defined in claim 3, further including means for reading out said cell comprising said second source operative alone for providing a change in potential opposite in direction to the change of potential in said first direction, and sensing means connected to the collector of said other transistor for sensing a change in the quiescent state of said cell.

5. A memory cell as defined in claim 3 including means for reading out said cell nondestructively, comprising a third source operative alone for producing a change in current flow in the already conducting transistor in said cell, and sensing means connected to the collector of said other transistor for sensing said variation in current flow.

6. A memory cell comprising at least first and second transistors, each having an emitter base and collector, the collector of the first transistor being directly connected to the base of the second transistor, a load impedance for said first transistor and a common impedance connected to the emitters of said first and second transistors, said memory cell having two quiescent states, a first state in which said first transistor is conductive and said second transistor is nonconductive and a second state in which said second transistor is conductive and said first transistor is nonconductive, a plurality of sources for providing quiescent bias and signals to said transistors, a first of said sources being connected in common to the emitters of said first and second transistors, and a second source being connected to the collector of said first transistor, a third source being connected to the base of said first transistor, sense means connected to the collector of said second transistor for sensing variations in current flow in said transistor responsive to the changes in potential applied to said first and second transistors by said plurality of sources, said second and third sources being operative coincidently with oppositely directed pulses to write a "1" into said memory cell, said third source being operative alone with a pulse direction opposite to that applied when operative coincidently, thereby to read out the state of said cell, said first source being operative alone for providing non-destructive read out of said cell by producing current variation in said second transistor without changing state of said cell.

7. A memory system comprising a plurality of memory cells, each cell comprising a pair of transistors having respectively an emitter, base and collector, the collector of one of said transistors therein being directly connected to the base of the other transistor, each cell having two quiescent states; a first stae in which said one transistor is conductive and the other is nonconductive, and a second state in which the other is conductive and said one is nonconductive; at least three lines connected to each of said cells, a first of said lines constituting a word line and being connected to each memory cell corresponding to a bit position in a predetermined data word, a second line constituting a bit line and being connected to the memory cells corresponding to the same bit positions in each of a plurality of data words, a third line constituting a sense line and being connected to the memory cells correspondning to the same bit positions in each of a plurality of data words, first and second bias and signal sources connected respectively to said first and second lines, said first and second sources being operative coincidently with oppositely directed pulses to write information into a predetermined one of the said memory cells by producing said first state.

8. A memory system as defined in claim 7, including means for reading out said cells, said means comprising said first source operative alone with a pulse of sufficient magnitude to change the state of said cell.

9. A memory system as set forth in claim 8, including sense means connected to said third line for detecting the storage state of those memory cells corresponding to the same bit positions in each of a plurality of data words.

10. A memory system comprising a plurality of memory cells in a matrix, each cell comprising a pair of transistors having an emitter, base and collector respectively, the collector of one of said transistors in each of said cells being directly connected to the base of the other transistor in each of said cells, each cell corresponding to a bit of information in a data word, a first line in said matrix being connected to the respective bases of said one of said transistors in those cells corresponding to bit positions in a predetermined data word, a second line in said matrix being connected to the respective collectors of said one of said transistors in those cells corresponding to the same bit position in different data words, a third line in said matrix being connected to the respective collectors of said other transistor in those cells corresponding to the same bit position in different data words, first and second bias and signal sources connected respectively to said first and second lines, sense means connected to said third line and, means for controlling the quiescent state of a predetermined memory cell, said means including said first and second sources operative coincidently with oppositely directed pulses to control the quiescent state.

11. A memory system as defined in claim 10, including means for reading out said predetermined cell comprising said first source operative alone with a pulse direction opposite to that applied when operative coincidently with said second source, said sense means being responsive to the change of state produced by said first source operative alone.

References Cited

UNITED STATES PATENTS

| | | | |
|---|---|---|---|
| 3,067,339 | 12/1962 | Poppelbaum | 307—290 X |
| 3,189,877 | 6/1965 | Pricer et al. | 340—173 |
| 3,354,440 | 11/1967 | Farber et al. | 340—173 |

BERNARD KONICK, *Primary Examiner.*

JOSEPH F. BREIMAYER, *Assistant Examiner.*

U.S. Cl. X.R.

307—238, 290

PO-1050
(5/69)

UNITED STATES PATENT OFFICE
CERTIFICATE OF CORRECTION

Patent No. 3,449,727 Dated June 19, 1969

Inventor(s) W. D. PRICER

It is certified that error appears in the above-identified patent and that said Letters Patent are hereby corrected as shown below:

In the specification, column 1, line 37, cancel "which machines,".

column 4, line 50, after "transistor 1 the word "conductive" should be -- nonconductive --.

Claim 6, line 19, before "transistor" insert -- second --; line 29 before "state" insert -- the--.

SIGNED AND SEALED

SEP 2 - 1969

(SEAL)
Attest:

Edward M. Fletcher, Jr.
Attesting Officer

WILLIAM E. SCHUYLER, JR.
Commissioner of Patents